United States Patent
Safa

(10) Patent No.: US 8,161,294 B2
(45) Date of Patent: Apr. 17, 2012

(54) SOFTWARE PROTECTION METHOD

(76) Inventor: John Aram Safa, Nottingham (GB)

( * ) Notice: Subject to any disclaimer, the term of this patent is extended or adjusted under 35 U.S.C. 154(b) by 562 days.

(21) Appl. No.: 11/815,738

(22) PCT Filed: Feb. 13, 2006

(86) PCT No.: PCT/GB2006/000483
§ 371 (c)(1),
(2), (4) Date: Apr. 21, 2009

(87) PCT Pub. No.: WO2006/085103
PCT Pub. Date: Aug. 17, 2006

(65) Prior Publication Data
US 2010/0275034 A1 Oct. 28, 2010

Related U.S. Application Data

(60) Provisional application No. 60/652,019, filed on Feb. 11, 2005.

(51) Int. Cl.
G06F 12/14 (2006.01)

(52) U.S. Cl. ....................................................... 713/190

(58) Field of Classification Search .................. 713/190, 713/189, 194; 717/130
See application file for complete search history.

(56) References Cited

U.S. PATENT DOCUMENTS

| 5,757,914 A | | 5/1998 | McManis |
| 6,006,328 A | * | 12/1999 | Drake .............................. 726/23 |
| 6,128,735 A | * | 10/2000 | Goldstein et al. ............. 713/166 |
| 6,237,137 B1 | | 5/2001 | Beelitz |
| 6,405,316 B1 | | 6/2002 | Krishnan et al. |
| 6,684,198 B1 | * | 1/2004 | Shimizu et al. .................. 705/50 |
| 6,725,605 B2 | * | 4/2004 | Schlachter et al. ........... 49/479.1 |
| 6,868,495 B1 | * | 3/2005 | Glover ........................... 713/190 |
| 6,898,708 B2 | * | 5/2005 | Hori et al. ....................... 713/171 |
| 7,240,033 B2 | * | 7/2007 | Kuriya et al. ................... 705/51 |
| 2001/0044782 A1 | * | 11/2001 | Hughes et al. .................. 705/59 |
| 2002/0099952 A1 | * | 7/2002 | Lambert et al. ................ 713/200 |
| 2003/0079158 A1 | * | 4/2003 | Tower et al. ..................... 714/23 |
| 2003/0093685 A1 | | 5/2003 | Tobin |
| 2003/0123665 A1 | * | 7/2003 | Dunstan et al. ............... 380/255 |
| 2004/0003264 A1 | | 1/2004 | Zeman et al. |

FOREIGN PATENT DOCUMENTS

| JP | 9231068 | 9/1997 |
| JP | 11175336 | 7/1999 |
| JP | 2004511310 A | 4/2004 |
| WO | 0206925 | 1/2002 |
| WO | 03009114 | 1/2003 |
| WO | 2004072891 A2 | 8/2004 |

OTHER PUBLICATIONS

Japanese Search Report for JP 554646-07, Aug. 2, 2011.

* cited by examiner

*Primary Examiner* — Brandon Hoffman
(74) *Attorney, Agent, or Firm* — Chernoff, Vilhauer, McClung & Stenzel

(57) ABSTRACT

A method of protecting an executable program from reverse engineering and/or tampering. The method includes receiving a copy of the executable program together with a debug database, the database storing the locations of functional blocks within the executable program. A protection code is inserted into the executable program so as to overwrite at least part of a functional block of the executable program. Subsequent execution of the functional block causes the protection code to be executed. The protection code, when executed, performs an operation and executes a copy of the overwritten part of the functional block.

32 Claims, 5 Drawing Sheets

SOFTWARE PROTECTION METHOD

This is a national stage application filed under 35 USC 371 based on International Application No. PCT/GB2006/000483 filed Feb. 13, 2006, and claims benefit/priority under 35 USC 119 of U.S. Provisional Application No. 60/652,019 filed Feb. 11, 2005.

The present invention relates to a software protection method, and in particular to a method of protecting an executable program which inhibits reverse engineering and/or tampering of the program.

Methods of software protection are continually being sought to inhibit the illegal copying and distribution of software. One form of software protection involves embedding protection code within a software application. Upon executing the software application, the protection code determines whether or not the computer attempting to execute the application is authorised to do so. Unfortunately, this form of software protection is susceptible to attacks by debuggers and disassemblers. For example, the software application may be disassembled and the location of protection code identified from the assembly code. Once the location of the protection code is known, additional code can be inserted into the software application to avoid the protection code or to fool the protection code into believe that the computer is authorised to execute the software application.

Methods of protecting a software application against reverse engineering include encrypting one or more fragments of the application. However, this requires knowledge of the source code of the application since not all fragments of the application are suitable for encryption. For example, any direct jump or call instruction that points to a location within encrypted code will naturally result in a fatal error during execution. Additionally, if no regard is given to the location of the code being encrypted, instructions immediately preceding the encrypted code may be incorrectly executed. Furthermore, the contents of registers are likely to be overwritten during decryption. Consequently, any routine that is partly encrypted is unlikely to execute correctly. Such methods of protection are therefore unsuitable for software applications for which the source code is unknown.

In addition to illegal copying and distribution of software, a further concern is the infection of software by Malicious code, such as virus and phishing code, particularly in view of the increasing exchange of data over communication networks. Whilst there are anti-virus applications that scan software for the presence of virus code, new viruses are continually being released. Consequently, anti-virus applications require frequent updating in order to be of any practical use.

In a first aspect, the present invention provides a method of protecting an executable program, the method comprising: receiving a copy of the executable program, the executable program comprising executable instructions arranged as a plurality of functional blocks; receiving a debug database associated with the executable program, the debug database storing the locations of the functional blocks within the executable program; identifying from the debug database the location of a functional block within the executable program; and inserting protection code into the executable program, the protection code overwriting at least part of the functional block, wherein execution of the functional block causes the protection code to be executed, and execution of the protection code performs an operation and executes a copy of the at least part of the functional block overwritten by the protection code.

Preferably, inserting protection code comprises: encoding at least part of the functional block to create encoded instructions; inserting a decoding routine into the executable program; and replacing the at least part of the functional block of the executable program with a call instruction to the decoding routine and with the encoded instructions, wherein the decoding routine comprises executable instructions for decoding the encoded instructions and for executing the decoded instructions.

Advantageously, encoding comprises encrypting the at least part of the functional block using an encryption key, and decoding comprises decrypting the encoded instructions using a decryption key.

Conveniently, the encryption key is derived from a fragment of code of the executable program, the decoding routine derives the decryption key from the fragment of code, and the encoded instructions are successfully decrypted in the event that no corruption of the fragment of code has occurred.

Preferably, the encryption key is derived from the instructions of a further functional block, the further functional block being encoded, and the decoding routine decodes the further functional block and derives the decryption key from the instructions of the further functional block, and the encoded instructions are successfully decrypted in the event that the further functional block is successfully decrypted.

Advantageously, at least one functional block includes a call or jump instruction to a location within a further function block, and the debug database stores the location to which each call or jump instruction of the executable program points, and the step of encoding a functional block comprises: selecting at least part of a functional block for encoding; identifying from the contents of the debug database jump and call instructions that point to a location within the selected at least part of the functional block; and encoding the selected at least part of the functional block in the event that no jump and calls instructions are identified.

Conveniently, inserting protection code comprises: encoding at least part of each of a plurality of functional blocks to create a plurality of segments of encoded instructions, each segment corresponding to a respective functional block; inserting a decoding routine into the executable program; and replacing the at least part of each of the plurality of functional blocks with a call instruction to the decoding routine and with a respective segment of encoded instructions, wherein the decoding routine comprises executable instructions for decoding and executing encoded instructions.

Preferably, inserting protection code comprises: encoding at least part of a first functional block with a first encoding algorithm to create first encoded instructions; encoding at least part of a second functional block with a second encoding algorithm to create second encoded instructions; inserting a first decoding routine into the executable program; inserting a second decoding routine into the executable program; replacing the at least part of the first functional block with a call instruction to the first decoding routine and with the first encoded instructions; and replacing the at least part of the second functional block of the executable program with a call instruction to the second decoding routine and with the second encoded instructions, wherein the first decoding routine comprises executable instructions for decoding the first encoded instructions and for executing the first decoded instructions, and the second decoding routine comprises executable instructions for decoding the second encoded instructions and for executing the second decoded instructions.

Advantageously, the first encoding routine and second encoding routine are different.

Conveniently, the method further comprises disassembling the functional block and selecting one or more instructions from the disassembled code, and wherein encoding at least part of the functional block comprises encoding one or more fragments of the functional block corresponding to the selected instructions.

Preferably, the decoding routine is inserted into the executable program at locations occupied by redundant instructions.

Advantageously, the debug database stores the start address of each functional block and information regarding the end address of each functional block, and the method comprises comparing the end address of a functional block with the start address of an adjacent functional block to identify redundant instructions between the two functional blocks.

Conveniently, the method comprises disassembling a functional block, and analysing the disassembled code to identify redundant instructions within the functional block.

Preferably, the functional block includes at least one call instruction having a call address, and the method further comprises: inserting a verification routine into the executable program; and modifying the call address of the call instruction such that the verification routine is executed prior to calling the call address.

Advantageously, the debug database stores the locations of call instructions within the executable program and inserting protection code comprises: inserting a verification routine into the executable program; identifying from the debug database the location of a call instruction within the executable program, the call instruction having a call address; and modifying the call address of the call instruction such that the verification routine is executed prior to calling the call address.

Conveniently, the verification routine comprises instructions for detecting corruption of the executable program.

Preferably, the verification routine comprises instructions for calling the call address in the event that no corruption is detected.

Advantageously, at least a fragment of the executable program is stored in a memory device during execution and the verification routine detects corruption of the fragment stored in memory.

Conveniently, the verification routine comprises instructions for corrupting or deleting the fragment of the executable program stored in the memory device in the event that corruption is detected.

Preferably, the verification routine comprises instructions for terminating execution of the executable program in the event that the corruption is detected.

Advantageously, the verification routine employs a CRC algorithm.

Conveniently, the verification routine comprises instructions for detecting whether a debug process is executing and for terminating execution of the executable program in the event that a debug process is detected.

Preferably, the method further comprises inserting intermediary code into the executable program, the intermediary code comprising a first call instruction to the verification routine and a second call instruction to the call address, and the call address is modified to call the intermediary code.

Advantageously, the method comprises identifying from the debug database the location of a plurality of call instructions within the executable program, each of the plurality of call instructions having a call address; inserting a respective segment of intermediary code for each of the plurality of call instructions, each segment of intermediary code comprising a first call instruction to the verification routine and a second call instruction to the call address of a respective call instruction of the executable program; and modifying the call address of each of the plurality of call instructions of the executable program to call a respective segment of intermediary code.

In a second aspect, the present invention provides a method of protecting an executable program, the method comprising: receiving, a copy of the executable program, the executable program comprising executable instructions arranged as a plurality of functional blocks; receiving a debug database associated with the executable program, the debug database storing the locations of the functional blocks within the executable program; identifying from the debug database the location of a functional block within the executable program; encoding at least part of the functional block to create encoded instructions; inserting a decoding routine into the executable program; and replacing the at least part of the functional block of the executable program with a call instruction to the decoding routine and with the encoded instructions, wherein the decoding routine comprises executable instructions for decoding the encoded instructions and for executing the decoded instructions.

In a third aspect, the present invention provides a method of protecting an executable program, the method comprising: receiving a copy of the executable program; receiving a debug database associated with the executable program, the debug database storing the locations of call instructions within the executable program; inserting a verification routine into the executable program; identifying from the debug database the location of a call instruction within the executable program, the call instruction having a call address; and modifying the call address of the call instruction such that the verification routine is executed prior to calling the call address.

In a fourth aspect, the present invention provides a device for protecting an executable program, the device comprising: means for receiving a copy of the executable program, the executable program comprising executable instructions arranged as a plurality of functional blocks; means for receiving a debug database associated with the executable program, the debug database storing the locations of the functional blocks within the executable program; means for identifying from the debug database the location of a functional block within the executable program; and means for inserting protection code into the executable program, the protection code overwriting at least part of the functional block, wherein execution of the functional block causes the protection code to be executed, and execution of the protection code performs an operation and executes a copy of the at least part of the functional block overwritten by the protection code.

In a fifth aspect, the present invention provides a device for protecting an executable program, the device comprising: means for receiving a copy of the executable program, the executable program comprising executable instructions arranged as a plurality of functional blocks; means for receiving a debug database associated with the executable program, the debug database storing the locations of the functional blocks within the executable program; means for identifying from the debug database the location of a functional block within the executable program; means for encoding at least part of the functional block to create encoded instructions; means for inserting a decoding routine into the executable program; and means for replacing the at least part of the functional block of the executable program with a call instruction to the decoding routine and with the encoded instructions, wherein the decoding routine comprises executable instructions for decoding the encoded instructions and for executing the decoded instructions.

In a sixth aspect, the present invention provides a device for protecting an executable program, the device comprising:

means for receiving a copy of the executable program; means for receiving a debug database associated with the executable program, the debug database storing the locations of call instructions within the executable program; means for inserting a verification routine into the executable program; means for identifying from the debug database the location of a call instruction within the executable program, the call instruction having a call address; and means for modifying the call address of the call instruction such that the verification routine is executed prior to calling the call address.

In a seventh aspect, the present invention provides a computer comprising instructions for performing the aforementioned method.

In an eighth aspect, the present invention provides a computer program or suite of computer programs executable by a computer to perform the aforementioned method.

In a ninth aspect, the present invention provides a computer program product storing computer program code executable by a computer to perform the aforementioned method.

In order that the present invention may be more readily understood, embodiments thereof will now be described, by way of example, with reference to the accompanying drawings, in which:

FIG. 1 illustrates an embodiment of the present invention in which protection code is inserted into an executable program to provide a protected copy of the executable program.

Figure 1:
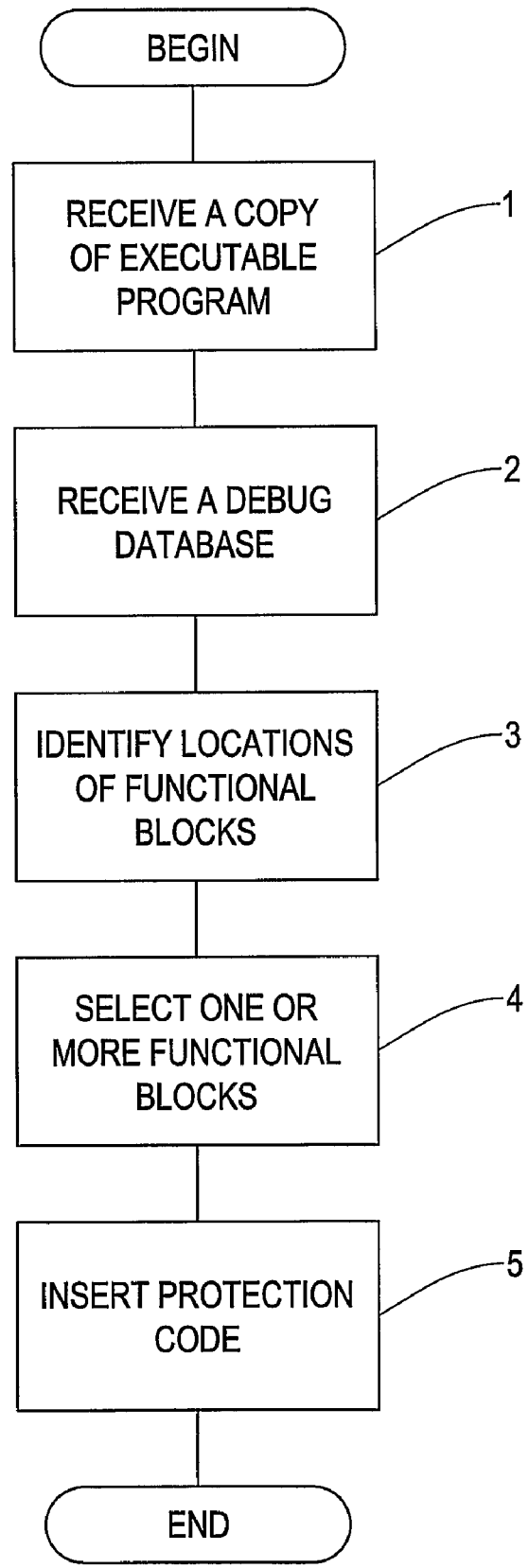
FIG. 1 illustrates a flow diagram of a method of protecting an executable program embodying the present invention.

The method comprises receiving 1 a copy of the executable program to be protected, receiving 2 a debug database associated with the executable program, identifying 3 from the contents of the debug database the locations of functional blocks within the executable program, selecting 4 one or more functional blocks of the executable program, and inserting 5 protection code into the executable program such that at least a part of each of the selected functional blocks is overwritten.

A functional block is regarded as a block of one or more executable instructions which, when executed, perform a particular function.

For a simple executable program (i.e. a program having few functional blocks and/or relatively simple instructions), it may be possible to identify functional blocks within the executable program by disassembling the executable program and analysing the assembly code. However, disassembly does not recover any symbolic information such as original function or class names for object-orientated languages such as C++ which compile directly to machine code (conversely, newer languages such as Java & C# retain symbolic information when compiled to their intermediate or byte code forms). This lack of symbolic information makes it extremely difficult to identify the start and end locations of functional blocks within more complicated executable programs and relate those back to the source code. This is particularly true of programs executed on platforms having an instruction set that employs variable length instructions, e.g. x86 instruction set. This difficulty in identifying functional blocks is resolved by the provision of a debug database associated with the executable program, and identifying 3 from the contents of the debug database the locations of the functional blocks.

The debug database is generated by a linker, typically by selecting an option to collate debug information, when assembling objects to create the executable program. The debug database includes, among other things, the relative address (i.e. location) of each functional block within the executable program. Additionally, the debug database includes the address of each direct call and jump instruction within the executable program, as well as the address to which the call or jump instruction points.

By way of example only, Microsoft® Visual Studio® can be configured to output a debug database file called a program database (PDB) file. The PDB file stores, among other things, the addresses of the functional blocks, the addresses of direct call and jump instructions and the addresses to which the call and jump instructions point.

Two embodiments for inserting protection code into the executable program will now be described.

Figure 2:
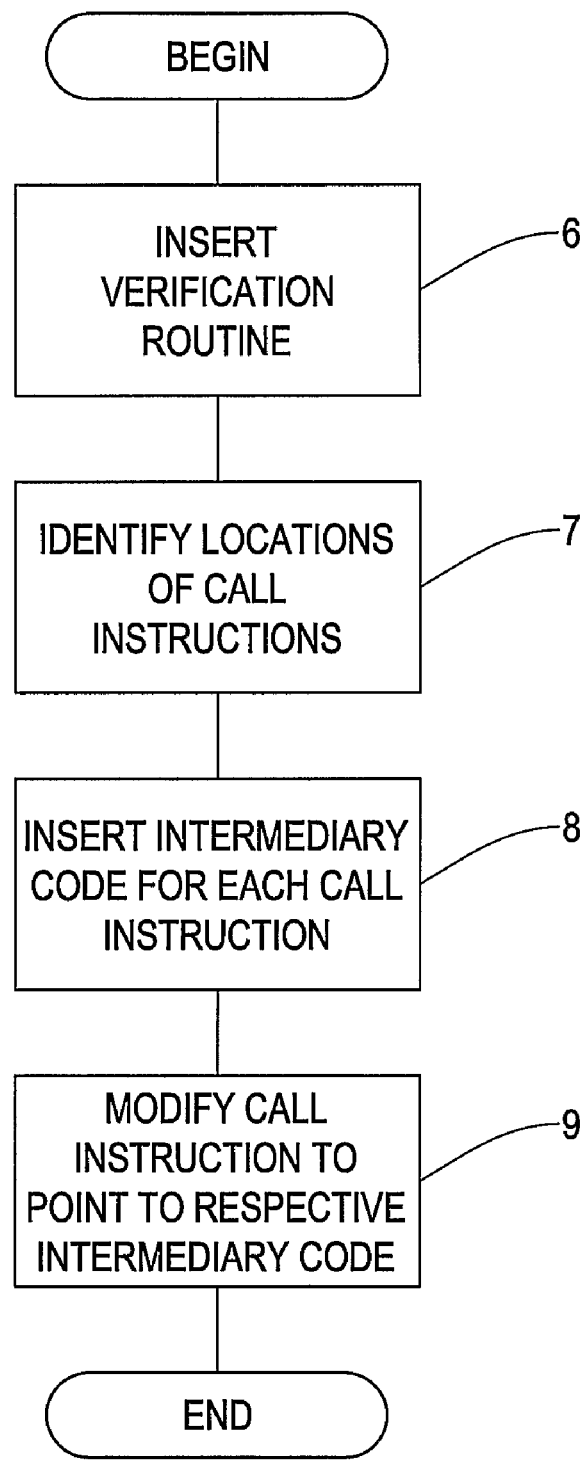
FIG. 2 illustrates a flow diagram of a method of inserting protection code into an executable program in accordance with a first embodiment of the present invention.

In a first embodiment, as illustrated in FIG. 2, a verification routine is inserted 6 into the executable program. The verification routine comprises executable instructions for verifying the integrity of the executable program, as described in more detail below. The verification routine is inserted 6 into the executable program by appending the routine to the end of the executable program or by embedding the routine within the executable program at one or more locations consisting of redundant code. Methods of identifying redundant code within the executable program are described below.

The locations of direct call instructions (as opposed to indirect call instructions) within the selected functional blocks are then identified 7 by reviewing the contents of the debug database, which stores the locations of direct call instructions and the addresses to which the call instructions point.

For each identified call instruction, respective intermediary code is inserted 8 into the executable program. As with the verification routine, the intermediary code may be appended to the end of the executable program or embedded at locations consisting of redundant code.

Each segment of intermediary code comprises two call instructions. The first call instruction points to the start address of the verification routine. The second call instruction points to the same address as that of the call instruction to which the intermediary code-corresponds.

After the intermediary code of a respective call instruction is inserted 8, the call instruction of the functional block is modified 9 such that the call instruction points to the start address of the intermediary code.

Figures 3A, 3B:
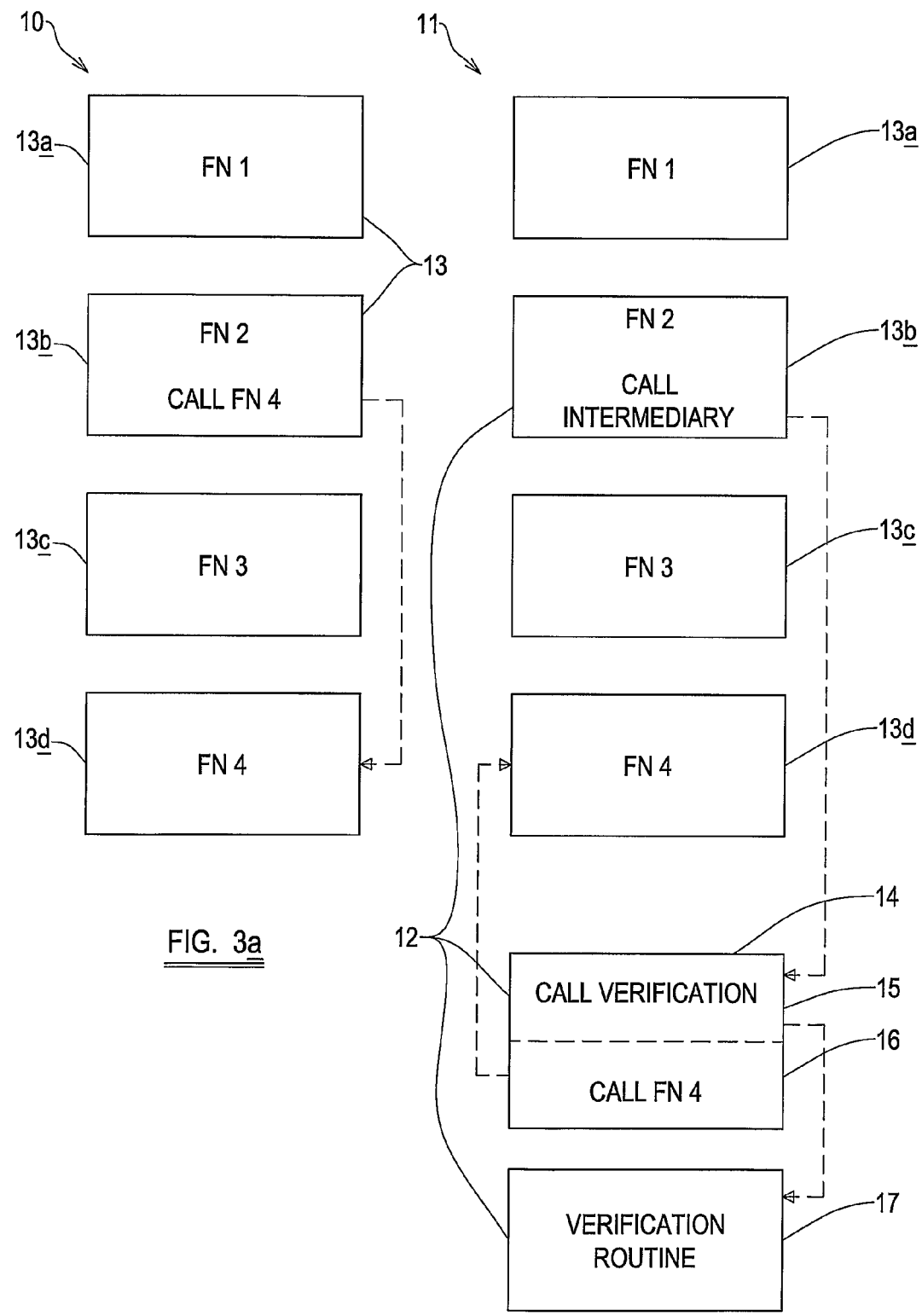
FIG. 3 illustrates an executable program before and after insertion of protection code by the method of FIG. 2.

FIG. 3(a) illustrates an unprotected executable program 10 and FIG. 3(b) illustrates a protected executable program 11 following insertion of protection code 12. The executable program 10 comprises four functional blocks 13. The second functional block 13b comprises a call instruction that points to the fourth functional block 13d. After insertion of the protection code 12, the call instruction of the second function block 13b points to respective intermediary code 14. The intermediary code 14 comprises two call instructions 15,16, the first call instruction 15 points to a verification routine 17 and the second call instruction 16 points to the fourth functional block 13d.

When the protected executable program 11 is executed, and a call is subsequently made to the second functional block 13b, the execution thread calls the intermediary code 14. The execution thread then executes the first instruction 15 of the intermediary code 14 and calls the verification routine 17, which verifies the integrity of the protected executable program 11. After execution of the verification routine 17, the execution thread returns to the intermediary code 14, executes the second call instruction 16 and calls the fourth functional block 13d. After execution of the fourth functional block 13d, the execution thread returns to the address immediately after the call instruction of the second functional block 13b, whereupon the remaining instructions of the second functional block 13b are executed. Finally, the return instruction of the second functional block 13b is executed, causing the execution thread to return to the originating call instruction.

The verification routine 17 verifies the integrity of the protected executable program 11 by performing one or more redundancy checks. Two different types of redundancy check may be performed by the verification routine 17. In the first, a static redundancy check is performed on the protected executable program 11 stored on disk. In the second, a dynamic redundancy check is performed on the protected executable program held in memory during execution.

During the step of inserting 5 protection code 12 into the executable program 10, one or more CRC values, or other redundancy check data, are derived from the executable program. For a static redundancy check, a single CRC value is derived from the full code of the protected executable program. For a dynamic redundancy check, each CRC value is derived from a fragment of code of the executable program. The CRC value or values are then stored within the protected executable program 11 (e.g. at locations within the verification routine 17) for subsequent use by the verification routine 17.

During subsequent execution of the protected executable program 11, the verification routine 17 recalculates the CRC value or values of the executable program 11 and compares these against the previously stored values in order to verify whether corruption of the executable program 11 has occurred. Any malicious code (e.g. debug code, virus code and phishing code) inserted into the executable program 11 will therefore be immediately identified.

If the verification routine 17 detects corruption of the protected executable program 11, the verification routine 17 terminates execution of the executable program 11. Optionally, the verification routine 17 corrupts or deletes any code of the executable program 11 stored in memory so as to prevent instructions being dumped from memory to disk.

Advantageously, the verification routine 17 comprises instructions for performing both a static redundancy check and a dynamic redundancy check. Alternatively, separate verification routines for performing a static redundancy check and a dynamic redundancy check may be inserted into the executable program. A call instruction of a functional block at or near the beginning of the executable program is then preferably modified such that a static redundancy check is performed early in the execution of the executable program. Consequently, any malicious code resident in the protected executable program may be identified before it is executed.

In the embodiment described above, intermediary code is inserted for each call instruction of the selected functional blocks, and each call instruction is modified to point to respective intermediary code. However, it is not essential that each and every call instruction of the functional blocks be protected in this way. Instead, one or more call instructions of the functional blocks may be left unchanged by the protection process.

Each segment of intermediary code comprises two call instructions. The location of two neighbouring call instructions may provide a target for hackers. Accordingly, the intermediary code may include additional defunct code between the two call instructions. For example, the intermediary code may include a jump instruction and junk code sandwiched between the two call instructions, the jump instruction pointing to the second call instruction.

In the embodiment described above, each segment of intermediary code 14 comprises a call instruction 15 to the verification routine 17. Alternatively, however, the call instruction 15 of one or more segments of intermediary code may be replaced a respective verification routine. The instructions of the verification routine may be different for each segment of intermediary code. Consequently, should a hacker manage to identify the location of one verification routine, the hacker would not necessary be capable of identifying other verification routines.

In the embodiment described above, the verification routine 17 performs CRC checks to detect possible corruption of the protected executable program. Additionally or alternatively, the verification routine 17 may comprise instructions for determining whether debug processes are executing and/or whether debug or reverse engineering tools are installed.

It will be understood that, in this embodiment, the protection code 12 inserted into the executable program comprises at least one verification routine 15 and two call instructions. The first call instruction points to the verification routine (either directly or indirectly by means of an intermediary call instruction) and is inserted into the executable program so as to overwrite an existing call instruction. The second call instruction corresponds to the overwritten call instruction and is inserted into the executable program such that it is executed after the first call instruction.

Figure 4:
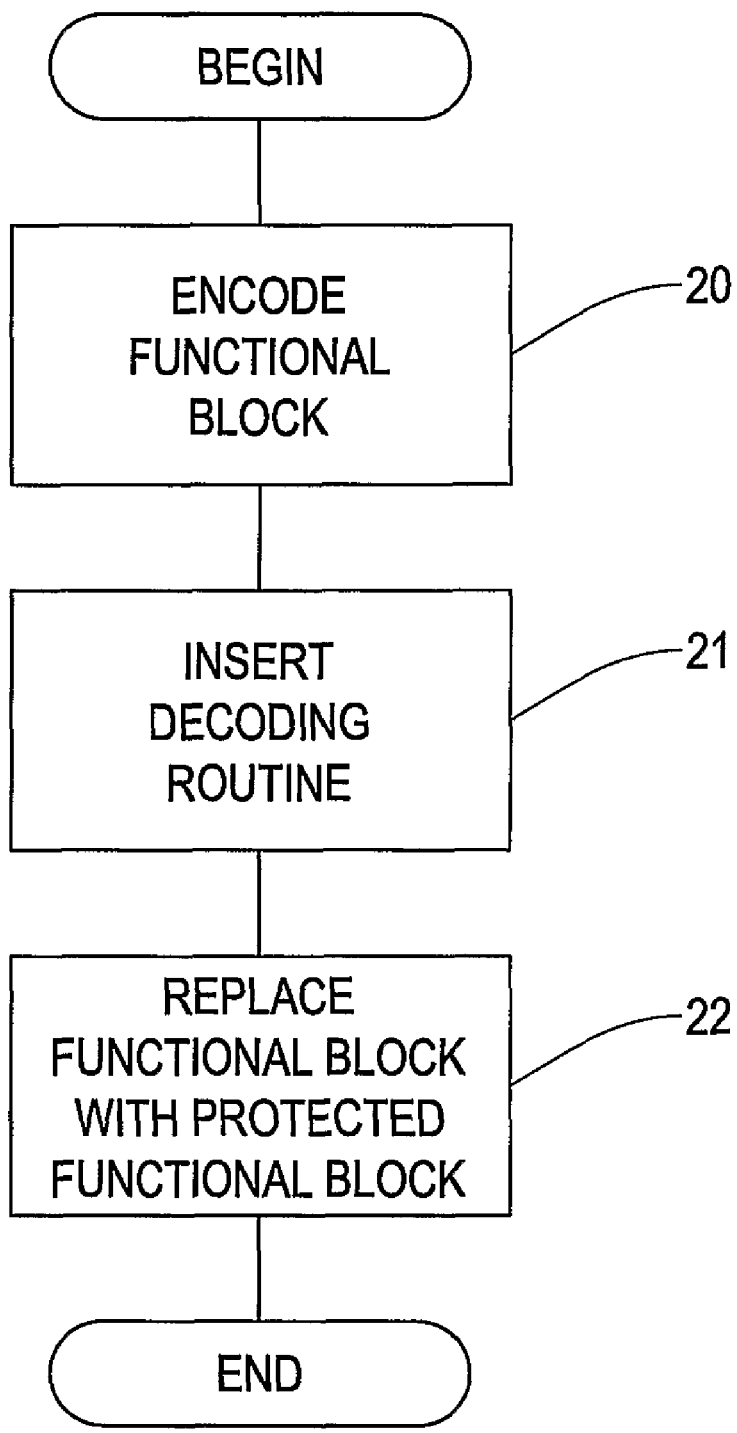
FIG. 4 illustrates a flow diagram of a method of inserting protection code into an executable program in accordance with a second embodiment of the present invention.

In a second embodiment, as illustrated in FIG. 4, the step of inserting protection code into the executable program comprises encoding 20 the instructions of a selected functional block with an encoding algorithm to create encoded instructions, inserting 21 a decoding routine into the executable program, and replacing 22 the functional block with a protected functional block, the protected functional block comprising a call instruction to the decoding routine and the encoded instructions. Each of the selected functional blocks is encoded in a similar manner and replaced by a respective protected functional block.

The 'encoding algorithm' comprises any algorithm capable of reversibly transforming the instructions of the functional block into a non-executable form. In particular, the terms 'encoding' and 'decoding' are intended to include, among other things, encryption and decryption as well as compression and decompression.

The decoding routine includes instructions for decoding the encoded instructions and executing the decoded instructions. The decoding routine uses the return address of the call instruction to identify the location of the encoded instructions within the protected block.

The decoding routine may additionally include a verification routine for verifying the integrity of the executable program, as described above. The verification routine optionally precedes any instructions for decoding such that decoding occurs only in the event that no corruption of the executable program is detected.

A functional block of an executable program may include a jump or call instruction to an address within a further functional block. If this further functional block comprises encoded instructions, a fatal error will arise. Consequently, not all functional blocks of the executable program are necessarily suitable for protection by encoding. Accordingly, the method additionally comprises reviewing the contents of the debug database to determine whether any of the direct call and jump instructions listed therein point to a location within a selected functional block. If a call or jump instruction points to a location within a selected functional block, protection of the functional block by encoding is prevented. If, however, a call or jump instruction points to the start address of the functional block, protection of the functional block by encoding is permitted.

The size of a protected functional block (i.e. the call instruction and encoded instructions) may be greater than the size of the original, unprotected functional block. Consequently, if the original functional block were replaced with the protected block, the encoded instructions would overwrite instructions of the subsequent functional block. Several methods may be employed to avoid overwriting a subsequent functional block.

In a first method, the selected functional block is examined for redundant code, using methods described below. Any redundant code is then omitted from the encoding process such that only useful instructions are encoded. By omitting redundant code from the encoding process, the size of the protected functional block is reduced.

In a second method, the protected functional block is divided into two or more fragments. The original functional block is overwritten by a first fragment of the protected functional block, which includes at least the call instruction. The remaining fragments of the protected functional block are then inserted (i.e. appended or embedded) into the executable program at other locations. Each fragment of the protected functional block may terminate with a pointer to the address of the next fragment such that the decoding routine is able to retrieve all fragments of the protected functional block. Alternatively, the first fragment of the protected functional block may include a list of the addresses of all remaining fragments of the protected functional block.

Third, the protection of a functional block may be prohibited in the event that the corresponding protected functional block is of a greater size.

Figures 5A, 5B:
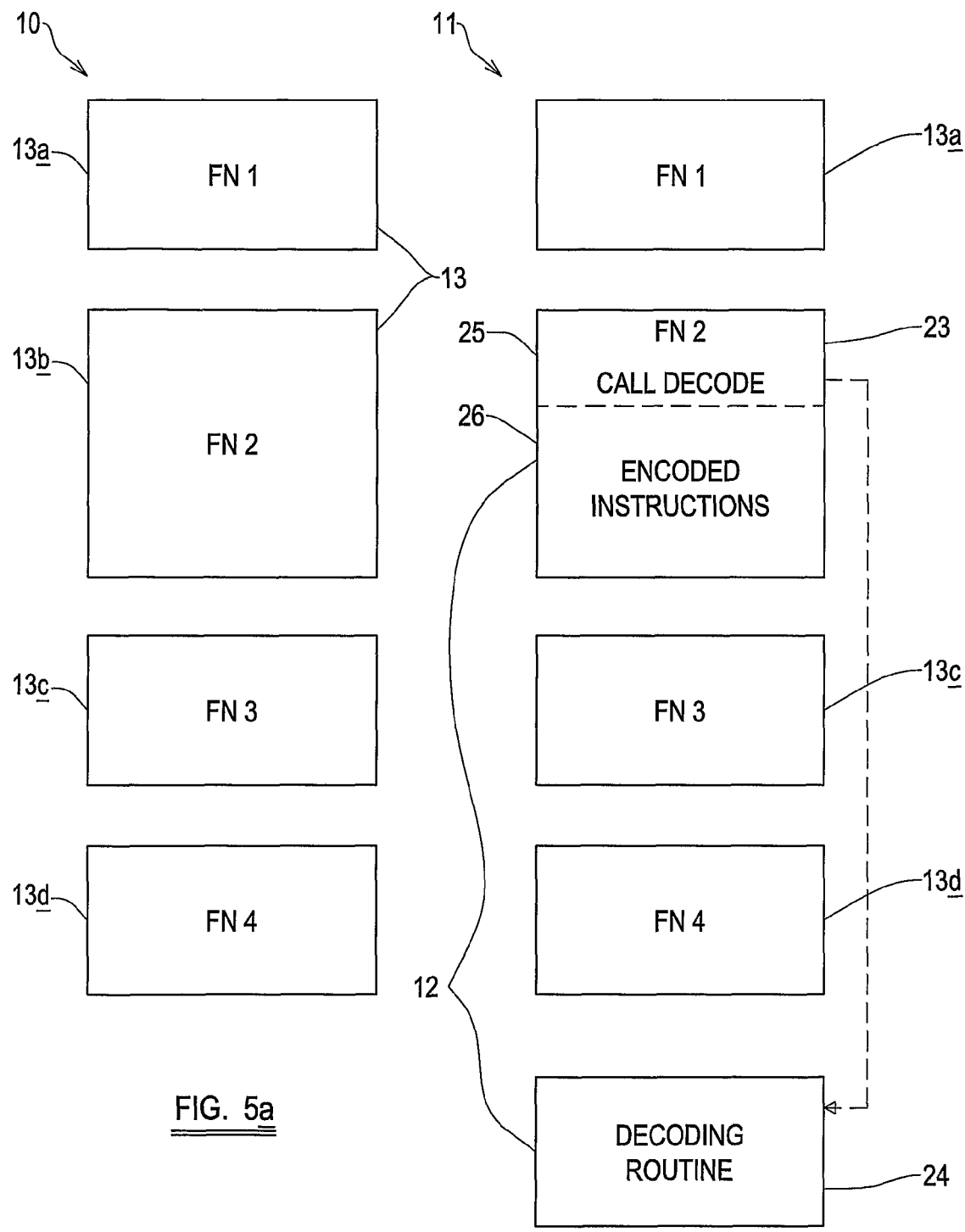
FIG. 5 illustrates an executable program before and after insertion of protection code by the method of FIG. 4.

FIG. 5(a) illustrates an unprotected executable program 10 and FIG. 5(b) illustrates a protected executable program 11 following insertion of protection code 12. The executable program 10 comprises four functional blocks 13, the second 13b of which is selected for protection. The second functional block 13b of the protected executable program 11 has been replaced with a protected functional block 23, and a decoding routine 24 has been inserted into the executable program 11. The protected functional block 23 comprises a call instruction 25 to the decoding routine 24, and encoded instructions 26.

When the protected executable program 11 is executed, and a call is subsequently made to the protected functional block 23, the execution thread calls the decoding routine 24, which decodes the encoded instructions 26 of the protected functional block 23 and executes the decoded instructions. The final instruction of the decoded instructions comprises a return instruction, causing the execution thread to return to the originating call instruction.

In the embodiment described above, each of the selected functional blocks is encoded using the same encoding algorithm. Alternatively, different encoding algorithms may be used to encode different functional blocks, with a corresponding decoding routine for each encoding algorithm being inserted into the executable program. Different strengths of encoding can then be used according to the importance of the functional block being encoded. For example, a simple XOR function may be used for functional blocks of little importance, whilst a strong encryption algorithm (e.g. DES, AES) may be used to encode more important functional blocks.

Encoding 20 the instructions of a functional block may comprise encrypting the instructions with an encryption algorithm that employs an encryption key. The encryption key may be derived from a fragment of code of the executable program. For example, a CRC value may be calculated for a fragment of the executable program and used to form an encryption key. The decoding routine then comprises instructions for calculating a CRC value for the same fragment of the executable program to form the decryption key. Consequently, the encoded instructions of the protected functional block are successfully decrypted only in the event that the fragment of the executable program from which the decryption key has been derived has not been corrupted.

In a further alternative, the encryption key used to encrypt a particular functional block may be derived from the instructions of a further (e.g. the immediately preceding) functional block, which is then itself encrypted. Consequently, a protected functional block is successfully decrypted only in the event that the further functional block is also successfully decrypted.

It will be understood that, in this embodiment, the protection code 12 inserted into the executable program 10 comprises at least one decoding routine 24 and at least one protected functional block 23, the protected block 23 being inserted into the executable program 10 so as to overwrite an existing functional block 13b. The protected functional block 23 comprises a call instruction 25 to the decoding routine 24 and encoded instructions 26, the encoded instructions 26 corresponding to those instructions of the functional block 13b that are overwritten.

Reference has thus far been made to encoding all instructions of a selected functional block. However, it may be preferable to encode only a selection of instructions within a functional block. In particular, several small segments of encoded instructions interspersed with unencoded instructions may provide a more robust form of protection than encrypting all instructions of the functional block. Additionally, it may not be suitable or practical to encode particular instructions of a functional block. Accordingly, in an alternative embodiment, only selected instructions of the functional block are encoded. This then provides coarse (encoding all instructions) and fine (encoding only selected instructions) control of encoding.

In order to select instructions for encoding, the functional block is first disassembled. Since the start address of the functional block is known from the debug database, disassembly of the functional block is much more reliable than it would otherwise have been had the start address not been known. From the resulting assembly code, instructions of the functional block are selected for encoding. The code of the executable program corresponding to the selected instructions is then encoded in the manner described above.

The two embodiments described above for inserting protection code need not be used exclusively but may be used in combination. For example, the same functional block may be subject to both of the described embodiments.

Reference has been made above to the insertion of code into the executable program at locations occupied by redundant code. There are at least two methods in which redundant code may be identified within the executable program.

In the first method, use is made of the debug database associated with the executable program. In addition to storing the start address of each functional block of the executable program, the debug database additionally stores the end address of each functional block and/or the size of each functional block. Redundant code between functional blocks may therefore be identified by comparing the end address of one functional block and the start address of the adjacent functional block.

In the second method, each functional block is disassembled. Redundant code is then identified from the assembly code as a repetitive series of instructions, e.g. no-op instructions, or patterns of known compiler/linker padding instructions.

The method embodying the present invention may be implemented as a suite of one or more computer programs. The program suite reads the contents of the debug database associated with the executable program to be protected, and displays (or otherwise outputs) a hierarchical listing of the functional blocks of the executable program. From this listing, the user is able to browse and select one or more functional blocks to be protected. An option is preferably provided to enable the user to select a functional block for disassembly. If a functional block is selected for disassembly, the program suite disassembles the selected functional block and displays (or otherwise outputs) a listing or representation of the assembly code. From the assembly code listing or representation, the user selects instructions of the functional block that require protection. Additionally, the program suite optionally enables a user to select the method or methods of protection for a selected functional block (or portion of a functional block) and, if appropriate, the type and strength of encoding. Once the user has selected the functional blocks (or portions of functional blocks) to be protected, the program suite inserts the protection code into the relevant locations of the executable program to create a protected executable program.

With the method embodying the present invention, an executable program may be protected through the insertion of protection code into the operational workings of the program. This then inhibits reverse engineering and/or tampering of the program. By using a debug database to identify the locations of functional blocks as well as the addresses of call and jump instructions, executable programs for which the source code is unknown may be protected. Moreover, specific areas of the executable program may be targeted for protection. In particular, sections of code of the executable program may be reliably disassembled and specific instructions identified and protected.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of protecting an executable program, the method comprising:
   receiving a copy of the executable program, the executable program comprising executable instructions arranged as a plurality of functional blocks;
   receiving a debug database associated with the executable program, the debug database storing the locations of the functional blocks within the executable program;
   identifying from the debug database the location of a functional block within the executable program; and
   inserting protection code into the executable program, the protection code overwriting at least part of the functional block,
   wherein execution of the functional block causes the protection code to be executed, and execution of the protection code performs an operation and executes a copy of the at least part of the functional block overwritten by the protection code.

2. A method according to claim 1, wherein inserting protection code comprises:
   encoding at least part of the functional block to create encoded instructions;
   inserting a decoding routine into the executable program; and
   replacing the at least part of the functional block of the executable program with a call instruction to the decoding routine and with the encoded instructions,
   wherein the decoding routine comprises executable instructions for decoding the encoded instructions and for executing the decoded instructions.

3. A method according to claim 2, wherein encoding comprises encrypting the at least part of the functional block using an encrYption encryption key, and decoding comprises decrypting the encoded instructions using a decryption key.

4. A method according to claim 3, wherein the encryption key is derived from a fragment of code of the executable program, the decoding routine derives the decryption key from the fragment of code, and the encoded instructions are successfully decrypted in the event that no corruption of the fragment of code has occurred.

5. A method according to claim 4, wherein the encryption key is derived from the instructions of a further functional block, the further functional block being encoded, and the decoding routine decodes the further functional block and derives the decryption key from the instructions of the further functional block, and the encoded instructions are successfully decrypted in the event that the further functional block is successfully decrypted.

6. A method according to claim 4, wherein the verification routine comprises instructions for detecting corruption of the executable program.

7. A method according to claim 2, wherein at least one functional block includes a call or jump instruction to a location within a further function block, and the debug database stores the location to which each call or jump instruction of the executable program points, and the step of encoding a functional block comprises:
   selecting at least part of a functional block for encoding;
   identifying from the contents of the debug database jump and call instructions that point to a location within the selected, at least part of the functional block; and
   encoding the selected at least part of the functional block in the event that no jump and calls instructions are identified.

8. A method according to claim 7, wherein the verification routine comprises instructions for calling the call address in the event that no corruption is detected.

9. A method according to claim 2, wherein the method further comprises disassembling the functional block and selecting one or more instructions from the disassembled code, and wherein encoding at least part of the functional block comprises encoding one or more fragments of the functional block corresponding to the selected instructions.

10. A method according to claim 2, wherein the decoding routine is inserted into the executable program at locations occupied by redundant instructions.

11. A method according to claim 1, wherein the debug database stores the start address of each functional block and information regarding the end address of each functional block, and the method comprises comparing the end address of a functional block with the start address of an adjacent functional block to identify redundant instructions between the two functional blocks.

12. A method according to claim 1, wherein the method comprises disassembling a functional block, and analyzing the disassembled code to identify redundant instructions within the functional block.

13. A method according to claim 1, wherein the functional block includes at least one call instruction having a call address, and the method further comprises:
   inserting a verification routine into the executable program; and
   modifying the call address of the call instruction such that the verification routine is executed prior to calling the call address.

14. A method according to claim 1, wherein the debug database stores the locations of call instructions within the executable program and inserting protection code comprises:
   inserting a verification routine into the executable program;
   identifying from the debug database the location of a call instruction within the executable program, the call instruction having a call address; and
   modifying the call address of the call instruction such that the verification routine is executed prior to calling the call address.

15. A method according to claim 13, wherein at least a fragment of the executable program is stored in a memory device during execution and the verification routine detects corruption of the fragment stored in memory.

16. A method according to claim 13, wherein the verification routine comprises instructions for terminating execution of the executable program in the event that the corruption is detected.

17. A method according to claim 13, wherein the verification routine employs a CRC algorithm.

18. A method according to claim 13, wherein the verification routine comprises instructions for detecting whether a debug process is executing and for terminating execution of the executable program in the event that a debug process is detected.

19. A method according to claim 13, wherein the method further comprises inserting intermediary code into the executable program, the intermediary code comprising a first call instruction to the verification routine and a second call instruction to the call address, and the call address is modified to call the intermediary code.

20. A method according to claim 13, wherein the method comprises identifying from the debug database the location of a plurality of call instructions within the executable program, each of the plurality of call instructions having a call address;
   inserting a respective segment of intermediary code for each of the plurality of call instructions, each segment of intermediary code comprising a first call instruction to the verification routine and a second call instruction to the call address of a respective call instruction of the executable program; and
   modifying the call address of each of the plurality of call instructions of the executable program to call a respective segment of intermediary code.

21. A method according to claim 1, wherein inserting protection code comprises:
   encoding at least part of each of a plurality of functional blocks to create a plurality of segments of encoded instructions, each segment corresponding to a respective functional block;
   inserting a decoding routine into the executable program; and
   replacing the at least part of each of the plurality of functional blocks with a call instruction to the decoding routine and with a respective segment of encoded instructions,
   wherein the decoding routine comprises executable instructions for decoding and executing encoded instructions.

22. A method according to claim 1, wherein inserting protection code comprises:
   encoding at least part of a first functional block with a first encoding algorithm to create first encoded instructions;
   encoding at least part of a second functional block with a second encoding algorithm to create second encoded instructions;
   inserting a first decoding routine into the executable program;
   inserting a second decoding routine into the executable program;
   replacing the at least part of the first functional block with a call instruction to the first decoding routine and with the first encoded instructions; and
   replacing the at least part of the second functional block of the executable program with a call instruction to the second decoding routine and with the second encoded instructions,
   wherein the first decoding routine comprises executable instructions for decoding the first encoded instructions and for executing the first decoded instructions, and the second decoding routine comprises executable instructions for decoding the second encoded instructions and for executing the second decoded instructions.

23. A method according to claim 22, wherein the first encoding routine and second encoding routine are different.

24. A method according to claim 22, wherein the verification routine comprises instructions for corrupting or deleting the fragment of the executable program stored in the memory device in the event that corruption is detected.

25. A computer comprising instructions for performing a method according to claim 1.

26. A computer program or suite of computer programs executable by a computer to perform a method according to claim 1.

27. A computer program product storing computer program code executable by a computer to perform a method according to claim 1.

28. A method of protecting an executable program, the method comprising:
   receiving a copy of the executable program, the executable program comprising executable instructions arranged as a plurality of functional blocks;
   receiving a debug database associated with the executable program, the debug database storing the locations of the functional blocks within the executable program;
   identifying from the debug database the location of a functional block within the executable program;
   encoding at least part of the functional block to create encoded instructions;
   inserting a decoding routine into the executable program; and
   replacing the at least part of the functional block of the executable program with a call instruction to the decoding routine and with the encoded instructions,
   wherein the decoding routine comprises executable instructions for decoding the encoded instructions and for executing the decoded instructions.

29. A method of protecting an executable program, the method comprising:
- receiving a copy of the executable program;
- receiving a debug database associated with the executable program, the debug database storing the locations of call instructions within the executable program;
- inserting a verification routine into the executable program;
- identifying from the debug database the location of a call instruction within the executable program, the call instruction having a call address; and
- modifying the call address of the call instruction such that the verification routine is executed prior to calling the call address.

30. A device for protecting an executable program, the device comprising:
- means for receiving a copy of the executable program, the executable program comprising executable instructions arranged as a plurality of functional blocks;
- means for receiving a debug database associated with the executable program, the debug database storing the locations of the functional blocks within the executable program;
- means for identifying from the debug database the location of a functional block within the executable program; and
- means for inserting protection code into the executable program, the protection code overwriting at least part of the functional block,
- wherein execution of the functional block causes the protection code to be executed, and execution of the protection code performs an operation and executes a copy of the at least part of the functional block overwritten by the protection code.

31. A device for protecting an executable program, the device comprising:
- means for receiving a copy of the executable program, the executable program comprising executable instructions arranged as a plurality of functional blocks;
- means for receiving a debug database associated with the executable program, the debug database storing the locations of the functional blocks within the executable program;
- means for identifying from the debug database the location of a functional block within the executable program;
- means for encoding at least part of the functional block to create encoded instructions;
- means for inserting a decoding routine into the executable program; and
- means for replacing the at least part of the functional block of the executable program with a call instruction to the decoding routine and with the encoded instructions,
- wherein the decoding routine comprises executable instructions for decoding the encoded instructions and for executing the decoded instructions.

32. A device for protecting an executable program, the device comprising:
- means for receiving a copy of the executable program;
- means for receiving a debug database associated with the executable program, the debug database storing the locations of call instructions within the executable program;
- means for inserting a verification routine into the executable program;
- means for identifying from the debug database the location of a call instruction within the executable program, the call instruction having a call address; and
- means for modifying the call address of the call instruction such that the verification routine is executed prior to calling the call address.

* * * * *